United States Patent
Mitchell et al.

(10) Patent No.: US 9,631,105 B2
(45) Date of Patent: *Apr. 25, 2017

(54) PPS ELECTRODE REINFORCING MATERIAL/CRACK MITIGANT

(75) Inventors: James Mitchell, Bloomfield, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 716 days.

This patent is subject to a terminal disclaimer.

(21) Appl. No.: 13/568,499

(22) Filed: Aug. 7, 2012

(65) Prior Publication Data

US 2014/0045095 A1 Feb. 13, 2014

(51) Int. Cl.

| | |
|---|---|
| *H01M 8/10* | (2016.01) |
| *B01J 31/06* | (2006.01) |
| *C09D 11/52* | (2014.01) |
| *H01M 4/88* | (2006.01) |
| *H01M 4/90* | (2006.01) |
| *H01M 4/92* | (2006.01) |
| *H01M 8/1007* | (2016.01) |
| *H01M 8/1018* | (2016.01) |

(52) U.S. Cl.
CPC ........... *C09D 11/52* (2013.01); *H01M 4/8807* (2013.01); *H01M 4/8846* (2013.01); *H01M 4/9075* (2013.01); *H01M 4/925* (2013.01); *H01M 8/1007* (2016.02); *H01M 2008/1095* (2013.01); *Y02P 70/56* (2015.11)

(58) Field of Classification Search
USPC .......... 429/483, 484–489, 492–494
See application file for complete search history.

(56) References Cited

U.S. PATENT DOCUMENTS

| | | | | |
|---|---|---|---|---|
| 4,435,252 | A * | 3/1984 | Kadija | ............ 205/75 |
| 7,888,433 | B2 | 2/2011 | Fuller et al. | |
| 7,897,691 | B2 | 3/2011 | MacKinnon et al. | |
| 7,897,692 | B2 | 3/2011 | MacKinnon et al. | |
| 7,897,693 | B2 | 3/2011 | MacKinnon et al. | |
| 8,053,530 | B2 | 11/2011 | Fuller et al. | |
| 2007/0099054 | A1 | 5/2007 | Fuller et al. | |

(Continued)

FOREIGN PATENT DOCUMENTS

| | | |
|---|---|---|
| CN | 101978540 | 2/2011 |
| JP | 2003077494 A | 3/2003 |
| JP | 2003-77494 | 10/2004 |

OTHER PUBLICATIONS

Miyatake et al., Synthesis of Poly(phenylene sulfide sulfonic acid) via Poly(sulfonium cation) as a Thermostable Proton-Conducting Polymer, Macromolecules, Jul. 22, 1996, 29, 6969-6971.*

*Primary Examiner* — Ula C Ruddock
*Assistant Examiner* — Osei Amponsah
(74) *Attorney, Agent, or Firm* — Brooks Kushman P.C.

(57) ABSTRACT

A metal electrode assembly for fuel cell applications includes a cathode catalyst layer, an anode catalyst layer, and an ion-conducting membrane disposed between the cathode catalyst layer and the anode catalyst layer. The cathode catalyst layer or the anode layer each independently including a catalyst composition and a first polymer wherein at least one of the cathode catalyst layer or the anode layer include a first polymer and polyphenylene sulfide-containing structures. A method for making a fuel cell catalyst layer is also provided.

8 Claims, 4 Drawing Sheets

(56) References Cited

U.S. PATENT DOCUMENTS

| | | | |
|---|---|---|---|
| 2009/0130526 A1* | 5/2009 | Higami et al. | 429/33 |
| 2009/0162725 A1* | 6/2009 | Terazono | H01M 4/8605 |
| | | | 429/423 |
| 2009/0246592 A1 | 10/2009 | Kinoshita | |
| 2011/0117472 A1* | 5/2011 | Koestner | H01M 4/8663 |
| | | | 429/483 |
| 2012/0094210 A1* | 4/2012 | Uensal | H01M 4/861 |
| | | | 429/483 |

* cited by examiner

PPS ELECTRODE REINFORCING MATERIAL/CRACK MITIGANT

The present invention relates to methods for making fuel cell components.

BACKGROUND OF THE INVENTION

In proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). Proton exchange membrane ("PEM") fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid (PFSA) ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive flow field elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer (PFSA). For example, PFSA is typically added to the Pt/C catalyst ink in electrode layer fabrication of proton exchange membrane fuel cells to provide proton conduction to the dispersed Pt nanoparticle catalyst as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer. Although the current technologies for making the ion-conducting membranes work reasonably well, there is still a need for improvement.

Accordingly, the present invention provides improved methods of making components that are useful in fuel cell applications.

SUMMARY OF THE INVENTION

The present invention solves one or more problems of the prior art by providing in at least one embodiment a metal electrode assembly for fuel cell applications. The metal electrode assembly includes a cathode catalyst layer, an anode catalyst layer, and an ion-conducting membrane disposed between the cathode catalyst layer and the anode catalyst layer. The cathode catalyst layer or the anode layer each independently includes a catalyst composition and a first polymer wherein at least one of the cathode catalyst layer or the anode layer includes a first polymer and polyphenylene sulfide-containing structures.

In another embodiment, an ink composition for forming a catalyst layer is provided. The ink composition includes a solvent, a first polymer, polyphenylene sulfide-containing fibers, and a catalyst composition.

In still another embodiment, a method for forming a fuel cell catalyst layer is provided. The method includes a step of combining a polyphenylene sulfide-containing resin with a water soluble carrier resin to form a resinous mixture. The resinous mixture is shaped to form a shaped resinous mixture. The shaped resinous mixture has polyphenylene sulfide-containing structures within the carrier resin. The shaped resinous mixture is contacted with water to separate the polyphenylene sulfide-containing structures from the carrier resin. The polyphenylene sulfide-containing structures is optionally sulfonated. The polyphenylene sulfide-containing structures are combined with a first polymer to form a polymeric composition. The polymeric composition is formed into a membrane with the sulfide-containing structures dispersed within the carrier resin.

Advantageously, polyphenylene sulfide and/or sulfonated polyphenylene sulfide (S-PPS)-containing structures (e.g.) fibers are added to the catalyst layers to improve durability and resistance to electrical shorting. PPS and S-PPS nanofibers are more structurally stable than expanded polytetrafluoroethylene web (ePTFE) currently used to reinforce polyelectrolyte membranes since the PPS and S-PPS nanofibers do not deform under pressure. Moreover, the PPS and S-PPS nanofibers readily disperse into water and alcohols and can be coated with an electrically conductive layer making them an excellent electrode reinforcement additive that mitigates cracking of the electrode layer on drying.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
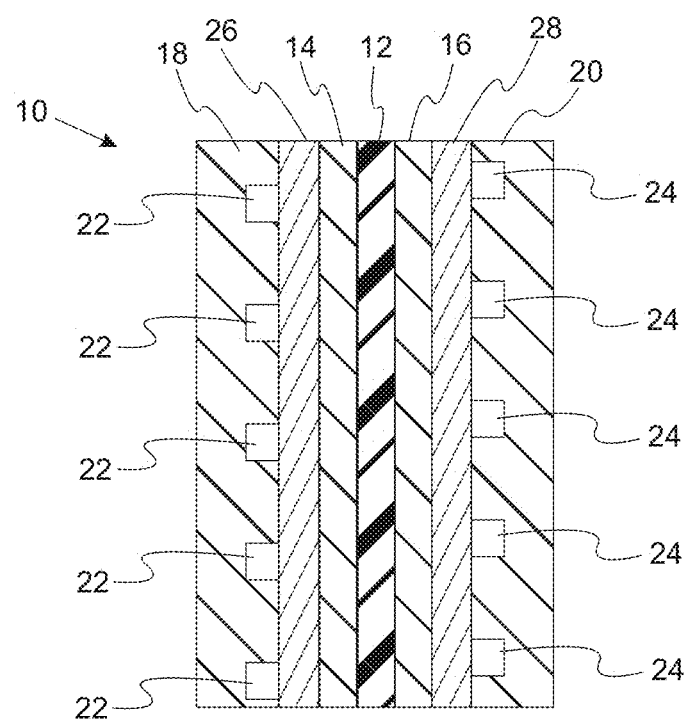
FIG. 1 provides a schematic illustration of a fuel cell incorporating a separator.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to weight average molecular weight unless indicated otherwise; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates an embodiment of a fibrous electrode is provided. Proton exchange membrane (PEM) fuel cell 10 includes polymeric ion-conducting membrane 12 disposed between cathode catalyst layer 14 and anode catalyst layer 16. Fuel cell 10 also includes flow field plates 18, 20, gas channels 22 and 24, and gas diffusion layers 26 and 28. Advantageously, the electrode layer 14 or 16 or both includes polyphenylene sulfide structures and in particular, polyphenylene sulfide fibers as set forth below.

Figure 2A:
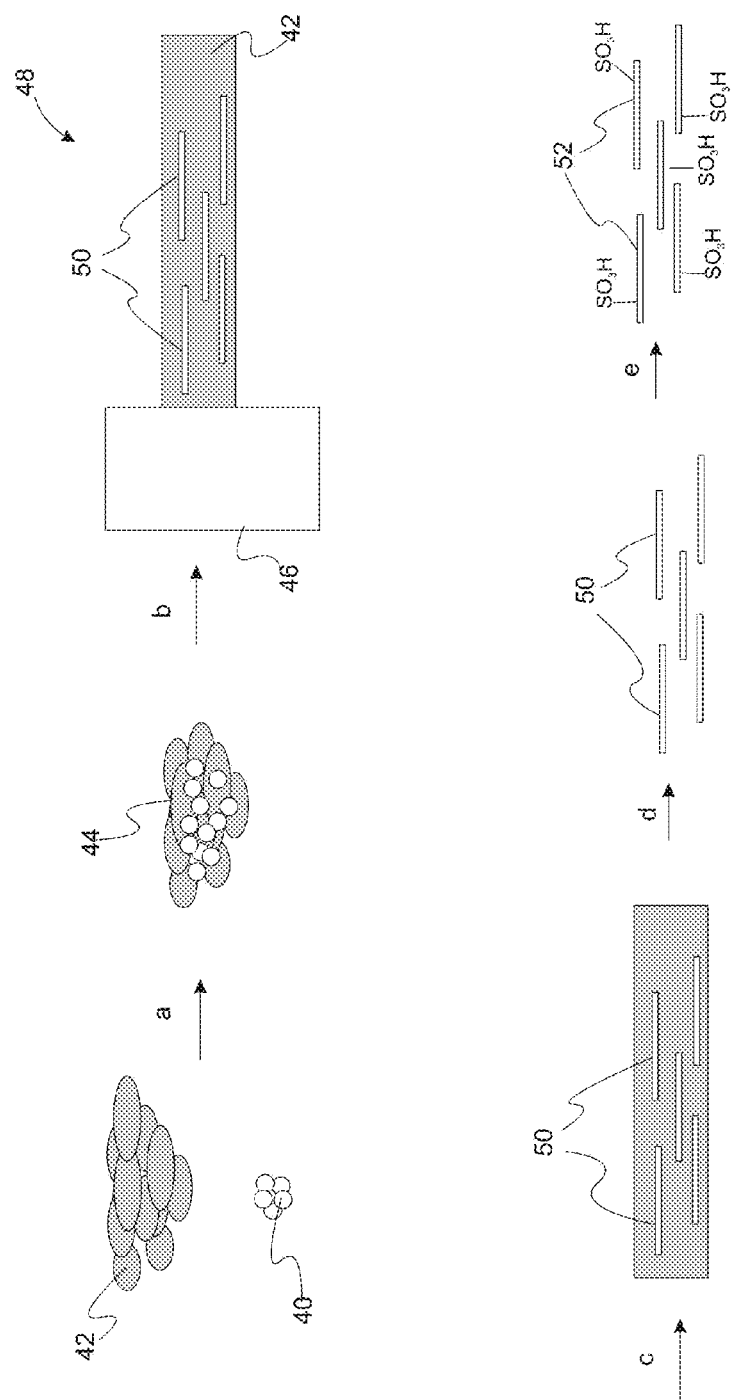
FIGS. 2A and 2B provide a schematic flow chart showing the fabrication of an electrode layer using polyphenylene sulfide fibers.
Figure 2B:
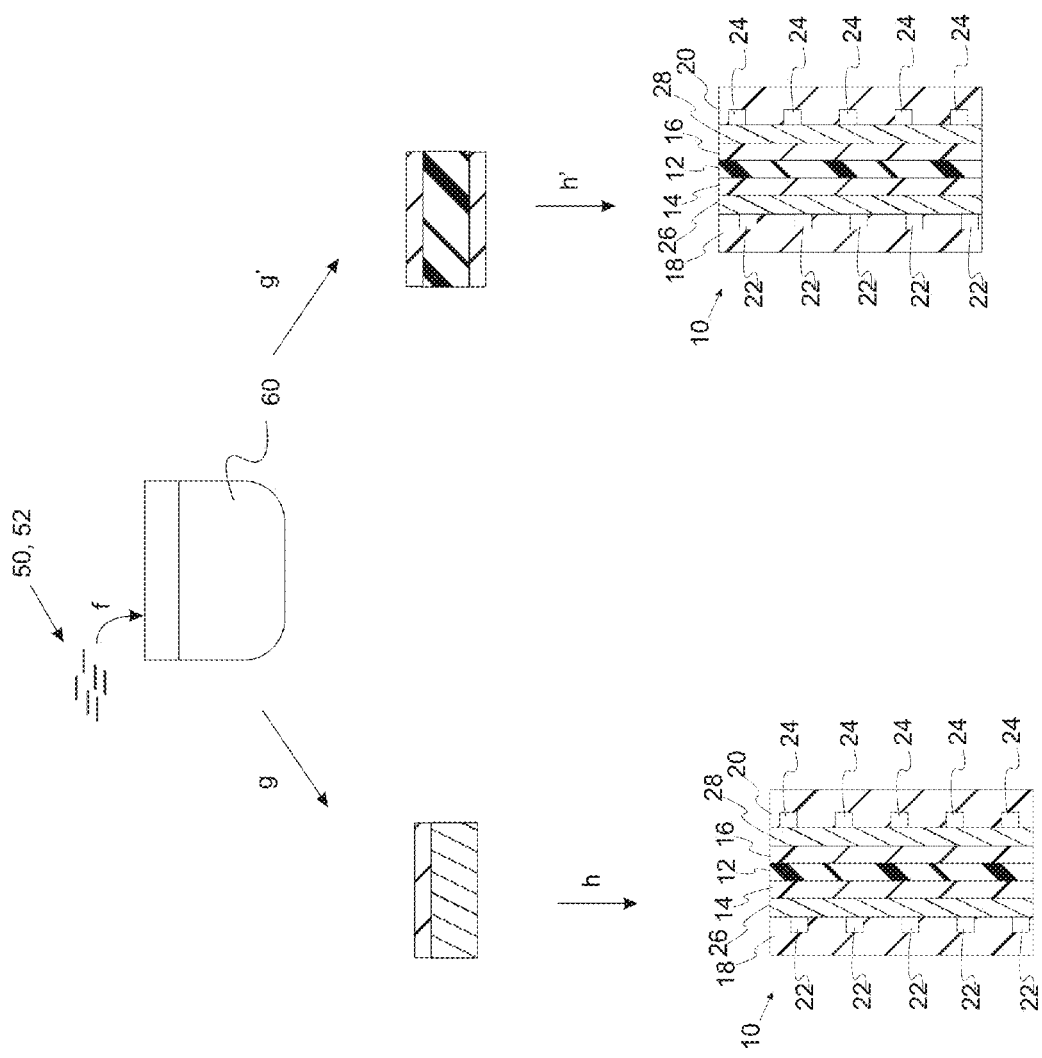

With reference to FIGS. 2A and 2B, a schematic flow chart illustrating a method for a polyphenylene sulfide-containing membrane is provided. In FIG. 2A_step a), polyphenylene sulfide-containing resin 40 is combined with water soluble carrier resin 42 to form resinous mixture 44. In a refinement, the weight ratio of polyphenylene sulfide-containing resin 40 to water soluble carrier resin 42 is 1:100 to about 10:1. In another refinement, the weight ratio of polyphenylene sulfide-containing resin 40 to water soluble carrier resin 42 is 1:50 to about 10:1. In still another refinement, the weight ratio of polyphenylene sulfide-containing resin 40 to water soluble carrier resin 42 is 1:10 to about 10:1. In step b), resinous mixture 44 is shaped. The shaping of the resinous mixture affects the shape of the polyphenylene sulfide-containing resin therein through the action of various forces (e.g., friction, shearing forces, etc.) transmitted to the polyphenylene sulfide-containing resin. FIG. 3 depicts a particular example in which resinous mixture 44 is extruded. Therefore, resinous mixture 44 is extruded from extruder 46 in step b) to form extruded resinous mixture 48. In other variations, the polyphenylene sulfide is in the form of beads, spheres, and oblong shapes. In a refinement of these variations, the polyphenylene sulfide has an average spatial dimension (e.g., a width) from about 5 nanometers to about 10 microns. Extruded resinous mixture 48 includes polyphenylene sulfide-containing fibers 50 within carrier resin 42. In step c), the extruded fiber is optionally separated from extruder 46. In step d), polyphenylene sulfide-containing fibers 50 are freed from the fiber by contacting/washing in water. In step e), protogenic groups (PG) are optionally added to the polyphenylene sulfide-containing fibers to form modified polyphenylene sulfide-containing fibers 52:

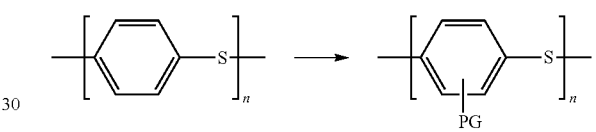

wherein PG is —$SO_2X$, —$PO_3H_2$, and —COX, and where X is an —OH, a halogen, or an ester and n is a number from about 20 to about 500 on average. In particular, the polyphenylene sulfide-containing fibers are sulfonated ($SO_3H$) in this step. Typically, polyphenylene sulfide fibers 50 and/or 52 have an average width from about 5 nanometers to about 30 microns. In another refinement, polyphenylene sulfide fibers 50 and/or 52 have an average width from about 5 nanometers to about 10 microns. In still another refinement, polyphenylene sulfide fibers 50 and/or 52 have an average width of from about 10 nanometers to about 5 microns. In still another refinement, polyphenylene sulfide fibers 50 and/or 52 have an average width of from about 100 nanometers to about 5 microns. In still another variation, polyphenylene sulfide fibers 50 and/or 52 have an average width of from about 50 nanometers to about 400 nm. In a variation, polyphenylene sulfide fibers 50 and/or 52 are coated with an electrically conductive layer (i.e., a metal layer). Examples of suitable metal coating process include, but are not limited to, sputtering, chemical vapor deposition, electroplating, and the like.

In FIG. 2B,_step f), ink composition 60 is formed from polyphenylene sulfide-containing structures. The ink composition 60 includes the PPS and S-PPS structures (e.g., fibers), a first polymer, a catalyst composition, and a solvent. In the example depicted in FIG. 2B, polyphenylene sulfide-containing structures are polyphenylene sulfide-containing fibers 50 and/or sulfonated polyphenylene sulfide-containing fibers 52. Suitable solvents include alcohols (e.g., methanol, ethanol, propanol, and the like) and water. Examples for the first polymer include, but are not limited to, ion-conducting polymer such as perfluorsulfonic acid polymers (PFSA) (e.g. NAFION™), perfluorocyclobutyl-containing polymer (PFCBs), and combinations thereof. Examples of useful PFSA polymers include a copolymer containing a polymerization unit based on a perfluorovinyl compound represented by:

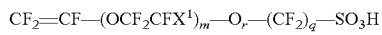

where m represents an integer of from 0 to 3, q represents an integer of from 1 to 12, r represents 0 or 1, and $X^1$ represents a fluorine atom or a trifluoromethyl group and a polymerization unit based on tetrafluoroethylene. Suitable polymers having cyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. In a variation, the ion-conducting polymer having perfluorocyclobutyl moieties includes a polymer segment comprising polymer segment 1:

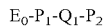  1 wherein:
 $E_0$ is a moiety, and in particular, a hydrocarbon-containing moiety, that has a protogenic group such as $-SO_2X$, $-PO_3H_2$, $-COX$, and the like;
 $P_1$, $P_2$ are each independently absent, $-O-$, $-S-$, $-SO-$, $-CO-$, $-SO_2-$, $-NH-$, $NR_2-$, or $-R_3-$;
 $R_2$ is $C_{1-25}$ alkyl, $C_{6-25}$ aryl or $C_{6-25}$ arylene;
 $R_3$ is $C_{1-25}$ alkylene, $C_{2-25}$ perfluoroalkylene, $C_{2-25}$ perfluoroalkyl ether, $C_{2-25}$ alkylether, or $C_{6-25}$ arylene;
 X is an $-OH$, a halogen, an ester, or

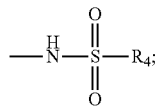

$R_4$ is trifluoromethyl, $C_{1-25}$ alkyl, $C_{2-25}$ perfluoroalkylene, or $C_{6-25}$ aryl; and
 $Q_1$ is a perfluorinated cyclobutyl moiety.
Examples for $Q_1$ and $Q_2$ in the above formulae are:

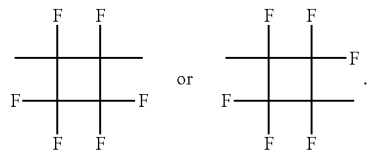

In a refinement, $E_0$ is a $C_{6-30}$ aromatic (i.e., aryl) containing group.

In step g), composition 60 is then coated out on a gas diffusion layers 26 and/or 28 to form cathode layer 14 and/or anode layer 16 disposed thereon and then dried (i.e., solvent allowed to evaporated or removed). In a variation of the present embodiment, cathode layer 14 and/or anode layer 16 have a thickness from about 5 microns to about 2 mm. In a refinement, cathode layer 14 and/or anode layer 16 have a thickness from about 5 microns to about 500 microns. In another refinement, cathode layer 14 and/or anode layer 16 have has a thickness from about 5 microns to about 50 microns. In step h), the coated gas diffusion layer formed in step g) is incorporated into fuel cell 10.

In a variation, composition 60 is then coated out on one or both of opposing sides of ion-conducting membrane 12 and then dried (i.e., solvent is allowed to evaporate or be removed by heating) in step g'). In a variation of the present embodiment, cathode layer 14 and/or anode layer 16 have a thickness from about 5 microns to about 2 mm. In a refinement, cathode layer 14 and/or anode layer 16 have a thickness from about 5 microns to about 500 microns. In another refinement, cathode layer 14 and/or anode layer 16 have has a thickness from about 5 microns to about 50 microns. In step h'), the coated ion-conducting membrane formed in step g') is incorporated into fuel cell 10.

As set forth above, the method of the invention utilizes water soluble resins. Examples of suitable water-soluble resins include, but are not limited to, water-soluble polyamides (e.g., poly(2-ethyl-2-oxazoline) ("PEOX"). In a refinement, the PEOX has a number average molecular weight from about 40,000 to about 600,000. Number average molecular weights of 200,000 and 500,000 have been found to be particularly useful.

As set forth with respect to the description of FIGS. 2A and 2B, ink composition 60 includes the PPS and S-PPS structure (e.g., fibers). Advantageously, the ink composition is useful for forming fuel cell catalyst and anode layers. The ink composition includes the PPS and S-PPS structures (e.g., fibers), a first polymer, a catalyst composition, and a solvent. In a refinement, the PPS and S-PPS structures are in an amount from about 0.05 to about 5 weight percent of the total weight of the ink composition. In a refinement, the first polymer is from about 0.5 to about 10 weight percent of the total weight of the ink composition. In another refinement, the catalyst composition is in an amount of about 1 weight percent to 8 weight percent of the total weight of the ink composition. Characteristically, the ink composition includes catalytically active material such as precious metals or precious metal-containing compound dispersed within an ionomer solution with a solvent. The amount of catalytically active material is present in an amount from about 0.5 weight percent to about 20 weight percent of the ink composition. In a particular refinement, the solvent makes up about 20 to 80 weight percent of the total weight of the ink composition. Useful solvents include, but are not limited to, alcohols (e.g., propanol, ethanol, methanol), water, or a mixture of water and alcohols. Characteristically, the solvents evaporate at room temperature. In another variation, the PPS or the S-PPS nanofibers are metallized with Pt or other catalytically active material and is included in the electrode layer in addition to the Pt/C nanoparticulate catalysts. In yet another refinement, the nanofibers are metalized with precious metals such as gold and are incorporated in the electrode layer.

The following examples illustrate the various embodiments of the present invention. Those skilled in the art will recognize many variations that are within the spirit of the present invention and scope of the claims.

Preparation of PPS Nanofibers.

Figure 3A:
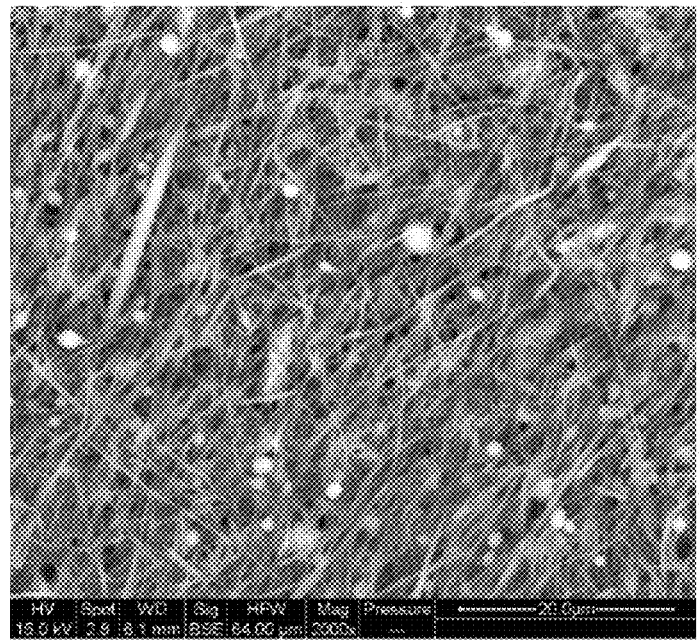
FIG. 3A provides a scanning electron micrograph of poly(phenylene sulfide) nanofibers.
Figure 3B:
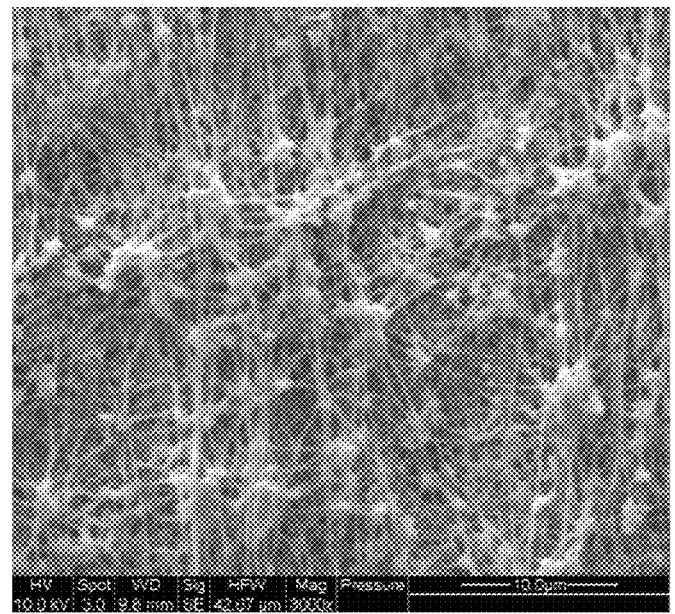
FIG. 3B provides a scanning electron micrograph of ePTFE fibers.

Polyphenylene sulfide (PPS) thermoplastic fibers are created by first dispersing PPS in 500,000 MW water-soluble poly(2-ethyl-2-oxazoline) (PeOX). Specifically, 5 grams of PPS are first blended in a Waring blender with 15 grams of 500,000 MW PeOX (at a ratio of 1 to 3). The combined blend is added to a laboratory mixing extruder (Dynisco, LME) operated at 240° C. header and rotor temperatures with the drive motor operated at 50% of capacity, resulting in an extruded strand of the blend. This extruded strand is added to the blender to return it to granular form, and then the granules are re-extruded two more times, creating a uniform extruded strand. During the final extrusion processes, the fibers are stretched and spun onto a take-up wheel (a Dynisco Take-Up System (TUS), at approximately 10 cm/second. The resulting extruded strand is washed in reverse osmosis (R.O.) water with repeated rinses, until the PeOX has been removed, resulting in a sample of PPS nanofibers. The fibers are then rinsed in isopropyl alcohol, filtered, and allowed to dry completely overnight. FIG. 3A provides a micrograph of poly(phenylene sulfide) nanofibers while FIG. 3B provides a micrograph of commercial ePTFE fiber mat.

Preparation of Sulfonated PPS Nanofibers.

The polyphenylene sulfide nanofibers are sulfonated in a way that does not reduce the high surface area form of the PPS back to a sheet form. Nanofibers of polyphenylene sulfide (2 grams) are suspended in methylene chloride (50 g) in a screw-cap jar with a Teflon gasketed lid. Chlorosulfonic acid is first dispersed in methylene chloride (1 gram in approximately 100 g). With vigorous stirring, chlorosulfonic acid dispersion (1 g of acid) in methylene chloride (50 mL) is added to the dispersion of PPS fibers in methylene chloride and the lid is secured. The jar is roll-milled for 4 hours and then the dark green-blue fibrous mixture is added to water (1 L), boiled for 1 hour, and is stirred at 23° C. for 16 hours. The sulfonated fibers are washed extensively with water and filtered onto a polypropylene mat (SeFar America). The ion exchange capacity of the fibers is 1.03 meq H⁺/g. The reaction is repeated using two grams of chlorosulfonic acid and two grams of nanofibers of polyphenylene sulfide. The ion exchange capacity of the resultant fibers is 1.3 meq H⁺/g. The resulting nanofibers of polyphenylene sulfide with sulfonic acid groups are referred to as S-PPS fibers.

Sonication of PPS Nanofibers.

Effectively dispersing the fibers is a vital step in the process of introducing them to the electrode as a reinforcing component. PPS nanofibers (0.10 g) are added to 3.33 grams of water and 6.67 grams of ethanol. The mixture is sonicated using a Misonix 3000 ultrasonic homogenizer for 5 minutes, set to a pulse mode of 10 seconds on and 10 seconds off at 18 Watts.

Dispersing the PPS Fibers.

Effectively dispersing the fibers is a vital step in the process of introducing them to an ink as a reinforcing component of an electrode. About 0.10 g of PPS nano-fibers are added to 3.33 grams of water and 6.67 grams of ethanol. The mixture is sonicated using a Misonix 3000 ultrasonic homogenizer for 5 minutes, set to a pulse mode of 10 seconds on and 10 seconds off at 18 Watts. The sample is then reduced by gentle heating to a final liquid weight of 9.12 g (9.22 grams). About 0.88 g of Pt (approximately 2.64 g carbon black catalyst, Tanaka) and about 0.79 g of Nafion® D2020 (at 21% solids). The material is then sonicated again for about 5 minutes, set to a pulse mode of 10 seconds on and 10 seconds off at 18 Watts. The resulting ink is applied with a Mayer rod coater, to form a catalyst layer.

Electrically Conductive Nano-Fibers.

The fibers, once formed in Step 1 are coated with a metal layer to improve electrical conductivity. Fibers are first dispersed into R.O. water using a Misonix 3000 ultrasonic homogenizer for 5 minutes, set to a pulse mode of 10 seconds on and 10 seconds off) at 18 Watts. The resulting dispersion is filtered onto a polycarbonate filter (0.45 um pore) to a thickness of approximately 2-4 µm. The resulting mat is placed in a Hummer Sputtering system, and the vacuum reduced to 88 mTorr (Argon). The sample is sputtered with gold/palladium using 15 mAmps for 30 seconds. The sputtering process is repeated as needed with the metalized filtered samples until sufficient amounts of nanofibers have received a conductive coating. The fibers are then processed as above to produce a reinforced electrode layer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A metal electrode assembly for a fuel cell, the metal electrode assembly comprising:
    a cathode catalyst layer;
    an anode catalyst layer, the cathode catalyst layer or the anode catalyst layer each independently including a catalyst composition wherein at least one of the cathode catalyst layer or the anode catalyst layer includes a first polymer and polyphenylene sulfide-containing structures that are coated with an electrically conductive layer, the polyphenylene sulfide-containing structures having the following formula:

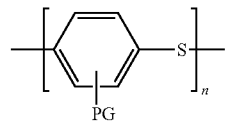

wherein PG is a protogenic group; and
    n is a number from about 20 to about 500 on average; and
    an ion-conducting membrane disposed between the cathode catalyst layer and the anode catalyst layer,
    wherein the polyphenylene sulfide-containing structures include a component selected from the group consisting of fibers, beads, spheres, and oblong shapes.

2. The metal electrode assembly of claim 1 wherein the catalyst composition includes a precious metal or a precious metal-containing compound.

3. The metal electrode assembly of claim 1 wherein the protogenic group is $SO_2X$, $-PO_3H_2$, or $-COX$ where X is an $-OH$, a halogen, or an ester.

4. The metal electrode assembly of claim 1 wherein the polyphenylene sulfide-containing structures have an average spatial dimension from about 5 nanometers to about 10 microns.

5. The metal electrode assembly of claim 1 wherein the ion-conducting membrane has an average thickness from about 5 microns to about 50 microns.

6. The metal electrode assembly of claim 1 wherein the first polymer is selected from the group consisting of perfluorosulfonic acid polymer, perfluorocyclobutyl-containing polymers and combinations thereof.

7. The metal electrode assembly of claim 1 wherein the first polymer includes a perfluorocyclobutyl-containing polymer.

8. The metal electrode assembly of claim 1 wherein the first polymer includes a combination of a perfluorocyclobutyl-containing polymer and a perfluorosulfonic acid polymer.

* * * * *